United States Patent [19]

Spease et al.

[11] Patent Number: 4,458,552
[45] Date of Patent: Jul. 10, 1984

[54] RETAINING CLIP IN A MOTION TRANSMITTING REMOTE CONTROL ASSEMBLY

[75] Inventors: Arthur L. Spease, Livonia; William G. Bennett, Troy; Thomas J. Frankhouse, Southfield, all of Mich.

[73] Assignee: Teleflex Incorporated, Limerick, Pa.

[21] Appl. No.: 327,345

[22] Filed: Dec. 4, 1981

[51] Int. Cl.³ .............................................. F16C 1/10
[52] U.S. Cl. .............................. 74/501 R; 74/501 P; 403/247; 248/56; 248/27.3; 248/544
[58] Field of Search ........................ 74/501 R, 501 P; 248/56, 27.3, 239, 544; 403/197, 195, 254, 247, 261

[56] References Cited

U.S. PATENT DOCUMENTS

| | | | |
|---|---|---|---|
| 2,078,453 | 4/1937 | Miller | 248/56 |
| 2,228,176 | 1/1941 | Miller | 403/247 |
| 2,236,130 | 3/1941 | Betebenner | 403/195 |
| 2,487,803 | 11/1949 | Heimann | 403/247 |
| 2,678,227 | 5/1954 | Niemeyer et al. | 403/247 |
| 2,954,248 | 9/1960 | Brickman | 248/56 |
| 3,101,205 | 8/1963 | Benham | 248/27.3 |
| 3,471,186 | 10/1969 | Luebbert et al. | 403/197 |
| 3,631,738 | 1/1972 | Harper | 74/501 R |
| 4,185,516 | 1/1980 | Betlinski . | |

Primary Examiner—Kenneth Dorner
Assistant Examiner—Anthony W. Raskob, Jr.
Attorney, Agent, or Firm—Harold W. Milton, Jr.

[57] ABSTRACT

A motion transmitting remote control assembly (10) of the type for transmitting forces along a curved path by a motion transmitting core element includes a conduit (14), a motion transmitting core element (12) movably supported by the conduit (14), and a support fitting (16) for supporting the conduit (14) through an aperture (18) of a support structure (20). The support fitting (16) includes a body portion (22) and an integral radially extending abutment (24) extending from the body portion (22) for abutting one extremity of the aperture (18). The support fitting (16) further includes a second integral abutment comprising a pair of stubs (26) extending from the body portion (22) and formed by the body portion having had a pair of legs (28) extending therefrom broken off. The instant invention is characterized by a substantially U-shaped retaining member (30) removably slidably mounted on the body portion (22) and having a first surface (32) engaging the pair of stubs (26) and a second opposite surface (34) for engaging the other extremity of the aperture (18) for retaining an otherwise nonreuseable support fitting (16) within the aperture (18).

34 Claims, 6 Drawing Figures

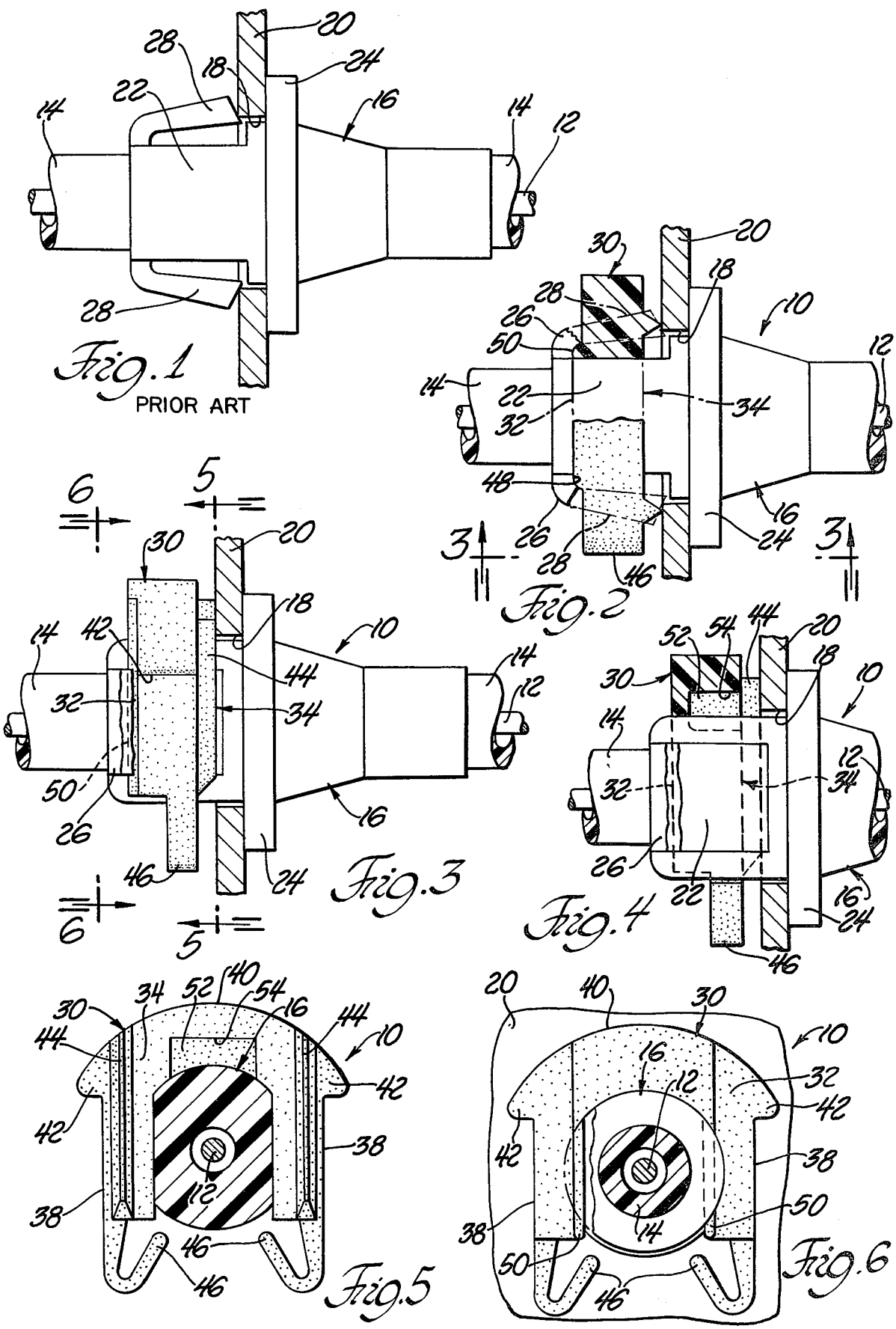

RETAINING CLIP IN A MOTION TRANSMITTING REMOTE CONTROL ASSEMBLY

TECHNICAL FIELD

This invention relates to a motion transmitting remote control assembly which is normally operated to control a device by transmitting tension or compression in a curved path by means of a flexible motion transmitting core element.

More specifically, the instant invention relates to a retaining means for retaining an otherwise nonreuseable end fitting of a motion transmitting remote control assembly within an aperture of a support structure wherein the end fitting had a pair of legs extending therefrom for retaining the end fitting within the aperture which were broken off.

BACKGROUND ART

There are several motion transmitting remote control assemblies known that include inserts disposed between an abutment of an end fitting or a support fitting and an extremity of an aperture of a support structure. Examples of such assemblies are discl0sed by the U.S. Pat. No. 3,631,738 to Harper and U.S. Pat. No. 4,185,516 to Betlinski. Harper disclosed an end fitting including radially movable legs extending therefrom for engaging one side wall of an aperture and an insert disposed between an abutment extending from the end fitting and the other side wall of the aperture. Betlinski teaches a resilient insert disposed about an end fitting between a retaining member, such as a nut, and a side wall of an aperture of a support structure. Neither insert can be slidably mounted upon the body portion of a support fitting between an abutment and an extremity of an aperture to retain the support fitting within the aperture. Moreover, neither patent discloses a retaining means for salvaging an otherwise nonreuseable support fitting having had legs extending therefrom broken off. In other words, if the legs of the end fitting disclosed by Harper were broken off, such as during removal of the end fitting from the aperture for repair of the conduit or cable connected thereto, neither the Harper nor the Betlinski inserts could be used to salvage the end fitting.

STATEMENT OF THE INVENTION

A motion transmitting remote control assembly of the type for transmitting forces along a curved path by a motion transmitting core element includes guide means, a motion transmitting core element movably supported by the guide means, and a support fitting for supporting the guide means through an aperture of a support structure. The support fitting includes a body portion and first integral abutment means for abutting one extremity of the aperture and second integral abutment means spaced from the first abutment means along the body portion. The invention is characterized by a substantially U-shaped retaining means removably slidably mounted on the body portion and having a first surface engaging the second abutment means and a second opposite surface for engaging the other extremity of the aperture for retaining the end fitting within the aperture.

FIGURES IN THE DRAWINGS

One embodiment of an assembly constructed in accordance with the present invention will now be described by way of example only, with reference to the accompanying drawings wherein:

FIG. 1 is a longitudinal fragmentary view of a prior art motion transmitting remote control assembly including a support fitting having legs extending therefrom retaining the support fitting within an aperture of a support structure;

FIG. 2 is a longitudinal view partially broken away and in cross section of the instant invention secured within an aperture of a support structure, the broken off legs of the support fitting of FIG. 1 being shown in phantom;

FIG. 3 is a longitudinal view of the instant invention taken substantially along lines 3—3 of FIG. 2;

FIG. 4 is a longitudinal view partially in cross section of the instant invention;

FIG. 5 is a cross-sectional view of the instant invention taken substantially along lines 5—5 of FIG. 3; and FIG. 6 is a cross-sectional view of the instant invention taken substantially along lines 6—6 of FIG. 3.

DETAILED DESCRIPTION OF THE DRAWINGS

A motion transmitting remote control assembly of the type for transmitting forces along a curved path by a motion transmitting core element is generally shown at 10 in FIGS. 2—6.

The assembly 10 includes a motion transmitting core element 12 and guide means 14 for movably supporting the motion transmitting core element 12. As shown in the FIGURES, the guide means comprises a conduit 14 which is shown as a single layer tubular member. The guide means may take on other forms to suit the particular use and environment thereof.

A support fitting, generally indicated at 16, supports the conduit 14 through an aperture 18 of a support structure 20. The support fitting 16 is disposed on the conduit 14 and is preferably formed from an organic polymeric material which fuses or bonds with a like material of the conduit 14. Generally, the support fitting 16 is molded about the conduit 14. Alternatively, the conduit may have a threaded end portion which is threadedly engaged within a female threaded portion of the support fitting.

The support fitting 16 includes a body portion 22 and first integral abutment means 24 for abutting one extremity of the aperture 18. The first integral abutment means 24 is shown as a radially outward extending flange engaging one extremity of the aperture 18. The flange 24 prevents the supporting fitting 16 from completely passing through the aperture 18 of the support structure 20. The support fitting 16 further includes second integral abutment means 26 spaced from the first abutment means 24 along the body portion 22. As shown in FIGS. 1 and 2, the second abutment means 26 comprises at least two stubs 26 extending from the body portion 22 and formed by the body portion 22 having had flexible legs 28 extending therefrom broken off. More specifically, various support fittings include a pair of flexible legs which pass through an aperture of a support structure for engaging the other end or side of the aperture to retain the support fitting within the aperture. Often, after continual use of the push-pull assembly, the support fitting is removed and reinserted into the aperture often enough that the flexible legs break off rendering the support fitting unreuseable. As shown in FIG. 2, the broken off legs, shown in phantom at 28, form stubs 26 extending from the body portion 22. These stubs 26 define the second abutment means 26. Alternatively, the second abutment means 26 may take the form of a radially outwardly extending flange projecting from the body portion and spaced from the first abutment means 24.

The instant invention is characterized by a substantially U-shaped retaining means, generally indicated at 30, removably slidably mounted on the body portion 22. The retaining means 30 has a first surface 32 engaging the second abutment means or stubs 26 and a second opposite surface, generally indicated at 34, for engaging the other extremity of the aperture 18 for retaining the end fitting 16 within the aperture 18. The retaining means 30 can be used to retain an otherwise nonresuseable support fitting 16 within an aperture 18 of a support structure 20. Thusly, the retaining means salvages an end fitting which would otherwise be discarded. Alternatively, the second abutment means 26 may consist of a radially outward flange and the retaining means 30 would be removably slidably mounted on the body portion of the support fitting between the flange and the other extremity of the aperture, thereby retaining the support fitting within the aperture. In other words, the retaining means 30 can be sold as a component of a motion transmitting remote control assembly or the retaining means 30 can be sold as an aftermarket device for salvaging an otherwise nonreuseable support fitting.

The retaining means 30 comprises a U-shaped member 30 including a pair of flexible arms 38 and an integral-connecting base 40 therebetween. Projections 42 extend outwardly from the arms 38 and provide a means for grasping the U-shaped member 30 when it is mounted upon the body portion 22 of a support fitting 16.

The U-shaped member 30 includes sizing means comprising a pair of linear projections 44 extending from the second surface 34 of the U-shaped member 30. The linear projections 44 are made of a material, such as an organic polymeric material, which can be removed by a predetermined amount to change the height thereof whereby a single U-shaped member 30 can be adapted to various size spaces between the stubs 26 and the other extremity of the aperture 18. This feature of the instant invention is quite significant when the U-shaped member 30 is used as an aftermarket product. The legs 28 of the original support fitting 16 may break off at various points. The sizing means of the instant invention allows a single U-shaped member 30 to be adapted to a support fitting 16 allowing for a range of various size stubs 26 and various size spaces between the stubs 26 and the extremity of the aperture 18.

The U-shaped member 30 includes locking means comprising an integral hook-shaped portion 46 extending from the end of each of the flexible arms 38. The hook-shaped portions 46 open towards each other to engage the body portion 22 when the U-shaped member is mounted onto the support fitting 16. Thusly, as the U-shaped member 30 is mounted onto the body portion 22 of the support fitting 16, the flexible legs 38 flex to allow the insertion of the body portion 22 between the hook-shaped portions 46. As the U-shaped member 30 is completely mounted about the body portion 22, the hook-shaped portions 46 engage the body portion 22 thereby preventing the removal of the U-shaped members 30. In order to remove the U-shaped members 30 from the body portion 22, the arms 38 are flexed outwardly away from the body portion 22 thereby disengaging the body portion 22 from the hook-shaped portions 46. The U-shaped member 30 is engaged from below the projections 42 and lifted from the body portion 22. The U-shaped member 30 can once again be mounted upon the body portion 22 to reuse the U-shaped member 30 and support fitting 16.

A groove 48 is generally formed between the stubs 26 and the body portion 22, as shown in FIG. 2. The U-shaped member 30 includes projections 50 extending from the first surface 32 thereof for seating engagement with the grooves 48.

The support fitting 16 includes at least one bulge 52 projecting therefrom having a first portion thereof for mating with a recess in the aperture 18 to prevent rotation of the support fitting 16 therewithin for seating engagement with the remainder of the bulge 52. The U-shaped member 30 may include other recesses or protrusions to mate with the specific configuration of various support fittings.

Thusly, the instant invention provides a retaining means for retaining a support fitting within an aperture. More specifically, the instant invention can be used to retain an otherwise nonreuseable support fitting, having had the retaining legs thereof broken off within an aperture of a support structure.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) of the type for transmitting forces along a curved path by a motion transmitting core element (12), said assembly (10) comprising; guide means (14), a motion transmitting core element (12) movably supported by said guide means (14), a support fitting (16) for supporting said guide means (14) through an aperture (18) of a support structure (20) and including a body portion (22) and first integral abutment means (24) for abutting one extremity of the aperture (18) and second integral abutment means (26) spaced from said first abutment means (24) along said body portion (22), and characterized by a substantially U-shaped retaining means (30) removably slideably mounted on said body portion (22) and having a first surface (32) engaging said second abutment means (26) and a second opposite surface (34) for engaging the other extremity of the aperture (18) for retaining said support fitting (16) within the aperture (18), said second abutmemt means (26) having at least one groove (48) therein, said retaining means (30) including at least one linear projection (50) extending from said first surface (32) thereof for seating engagement with said grooves (48).

2. An assembly as set forth in claim 1 further characterized by said retaining means (30) including sizing means (44) for adjusting the thickness of said retaining means (30) to fit said retaining means (30) between said second abutment means (26) and the other extremity of the aperture (18).

3. An assembly as set forth in claim 2 further characterized by said retaining means (30) including locking means (46) for removably locking said retaining means (30) onto said body portion (22) of said support fitting (16).

4. An assembly as set forth in claim 3 further characterized by said support fitting (16) including at least one bulge (52) projecting therefrom having a first portion thereof for mating with a recess in the aperture (18) to prevent rotation of said support fitting (16) therewithin, said retaining means (30) including at least one indentation (54) for seating engagement with the remainder of said bulge (52).

5. An assembly as set forth in claim 4 further characterized by said retaining means (30) comprising a U-shaped member (30) including a pair of flexible arms (38) and an integral-connecting base (40) therebetween.

6. An assembly as set forth in claim 5 further characterized by said sizing means comprising a pair of linear projections (44) extending from said second surface (34) of said U-shaped member (30), said projections (44) being made of a material which can be removed by a predetermined amount to change the height thereof whereby said U-shaped member (30) can be adapted to various size spaces between said second abutment means (26) and the other extremity of the aperture (18).

7. An assembly as set forth in claim 5 further characterized by said locking means comprising an integral hook-shaped portion (46) extending from the end of each of said arms (38) and opening towards each other to engage said body portion (22) when said U-shaped member (30) is mounted onto said support fitting (16).

8. An assembly as set forth in claim 1 further characterizied by said second abutment means (26) comprising a pair of flanges (26) extending radially outward from said body portion (22).

9. An assembly as set forth in claim 8 further characterized by said retaining means (30) including sizing means (44) for adjusting the thickness of said retaining means (30) to fit said retaining means (30) between said second abutment means (26) and the other extremity of the aperture (18).

10. An assembly as set forth in claim 9 further characterized by each of said flanges (26) having at least one of said grooves (48) therein, said projections (50) extending from said second surface (34) thereof for seating engagement with said grooves (48).

11. An assembly as set forth in claim 10 further characterized by said retaining means (30) including locking means (46) for removably locking said retaining means (30) onto said body portion (22) of said support fitting (16).

12. As assembly as set forth in claim 11 further characterized by sid support fitting (16) including at least one bulge (52) projecting therefrom having a first portion thereof for mating with a recess in the aperture (18) to prevent rotation of said support fitting (16) therewithin, said retaining means (30) including at least one indentation (54) for seating engagement with the remainder of said bulge (52).

13. An assembly as set forth in claim 12 further characterized by said retaining means (30) comprising a U-shaped member (30) including a pair of flexible arms (38) and an integral-connecting base (40) therebetween.

14. An assembly as set forth in claim 13 further characterized by said sizing means comprising a pair of linear projections (44) extending from said second surface (34) of said U-shaped member (30), said projections (44) being made of a material which can be removed by a predetermined amount to change the height thereof whereby said U-shaped member (30) can be adapted to various size spaces between said second abutment means (26) and the other extremity of the aperture (18).

15. An assembly as set forth in claim 14 further characterized by said locking means comprising an integral hook-shaped portion (46) extending from the end of each of said arms (38) and opening towards each other to engage said body portion (22) when said U-shaped member (30) is mounted onto said support fitting (16).

16. An assembly as set forth in claim 1 further characterized by said second abutment means (26) comprises at least two stubs (26) extending from said body portion (22) and formed by said body portion (22) having had flexible legs (28) extending therefrom broken off.

17. An assembly as set forth in claim 16 further characterized by said retaining means (30) including sizing means (44) for adjusting the thickness of said retainging means (30) to fit said retaining means (30) between said second abutment means (26) and the other extremity of the aperture (18).

18. An assembly as set forth in claim 17 further characterized by said support fitting (16) having one of said grooves (48) between each of said stubs (26) and said body portion (22), said projections (50) extending from said first surface (32) thereof for seating engagement with said grooves (48).

19. An assembly as set forth in claim 18 further characterized by said retaining means (30) including locking means (46) for removably locking said retaining means (30) onto said body portion (22) of said support fitting (16).

20. As assembly as set forth in claim 19 further characterized by said support fitting (16) including at least one bulge (52) projecting therefrom having a first portion thereof for mating with a recess in the aperture (18) to prevent rotation of said support fitting (16) therewithin, said retaining means (30) including at least one indentation (54) for seating engagement with the remainder of said bulge (52).

21. An assembly as set forth in claim 20 further characterized by said retaining means (30) comprising a U-shaped member (30) including a pair of flexible arms (38) and an integral-connecting base (40) therebetween.

22. An assembly as set forth in claim 21 further characterized by ssid sizing means comprising a pair of linear projections (44) extending from said second surface (34) of said U-shaped member (30), said projections (44) being made of a material which can be removed by a predetermined amount to change the height thereof whereby said U-shaped member (30) can be adapted to various size spaces between said second abutment means (26) and the other extremity of the aperture (18).

23. An assembly as set forth in claim 22 further characterized by said locking means comprising an integral hook-shaped portion (45) extending from the end of each of said arms (38) and opening towards each other to engage said body portion (22) when said U-shaped member (30) is mounted onto said support fitting (16).

24. An assembly as set forth in claim 1 further characterized by said retaining means (30) including locking means (46) for removably locking said retaining means (30) onto said body portion (22) of said support fitting (16).

25. An assembly as set forth in claim 24 further characterized by said retaining means (30) comprising a U-shaped member (30) including a pair of flexible arms (38) and an integral-connecting base (40) therebetween.

26. An assembly as set forth in claim 25 further characterized by said locking means comprising an integral hook-shaped portion (46) extending from the end of each of said arms (38) and opening towards each other to engage said body portion (22) when said U-shaped member (30) is mounted onto said support fitting (16).

27. A retaining device (30) for retaining a support fitting (16) of a motion transmitting remote control assembly (10) within an aperture (18) of a support structure (20) wherein the support fitting (16) includes a body portion (22) and a first integral abutment (24) for abutting a first extremity of the aperture (18) and a second abutmemt (26) comprising a pair of stubs (26) extending from the body portion (22) and formed by the body portion (22) having had a pair of legs (28) extending therefrom broken off, said retaining device (30) characterized by comprising a substantially U-shaped member (30) having a first surface (32) for engaging the pair of stubs (26) and a second opposite surface (34) for engaging the other extremity of the aperture (18) for being slideably mounted onto the body portion (22) of the support fitting (16) to retain an otherwise non-reusable support fitting (16) within the aperture (18), said U-shaped member (30) being made from a polymeric material and including sizing means (44) which is selectively removable for adjusting the thickness of said U-shaped member (30) to fit said U-shaped member (30) between the second abutment (26) of the support fitting (16) and the other extremity of the aperture (18), said U-shaped member (30) including linear projections (50) extending from said first surface (32) thereof for seating engagement with grooves (48) between the stubs (26) and the body portion (22) of the support fitting (16).

28. As assembly as set forth in claim 27 further characterized by U-shaped member (30) including locking means (46) for removably locking said retaining means (30) onto said body portion (22) of said support fitting (16).

29. An assembly as set forth in claim 28 further characterized by said U-shaped member (30) including at least one indentation for mating engagement with a portion of a bulge (52) projecting from the support fitting (16) for preventing rotation of the support fitting (16) within the aperture (18).

30. An assembly as set forth in claim 29 further characterized by said U-shaped member (30) including a pair of flexible arms (38) and an integral-connecing base (40) therebetween.

31. An assembly as set forth in claim 30 further characterized by said sizing means comprising a pair of linear projections (44) extending from said second surface (34) and being made of a material which can be removed by a predetermined amount to change the height thereof whereby said U-shaped member (30) can be adapted to various size spaces between the stubs (26) and the other extremity of the aperture (18).

32. An assembly as set forth in claim 31 further characterized by said locking means comprising an integral hook-shaped portion (46) extending from the end of each of said arms (38) and opening towards each other to engage the body portion (22) of the support fitting (16) when the U-shaped member (30) is mounted thereon.

33. An assembly as set forth in claim 32 further characterized by said U-shaped member (30) including a pair of flexible arms (38) and an integral-connecting base (40) therebetween.

34. An assembly as set forth in claim 33 further characterized by said locking means comprising an integral hook-shaped portion (46) extending from the end of each of said arms (38) and opening towards each other to engage the body portion (22) of the support fitting (16) when the U-shaped member (30) is mounted thereon.

* * * * *